(12) United States Patent
Fukuda

(10) Patent No.: US 9,235,358 B2
(45) Date of Patent: Jan. 12, 2016

(54) PRINTING APPARATUS, CONTROL METHOD OF PRINTING APPARATUS, AND STORAGE MEDIUM

(71) Applicant: CANON KABUSHIKI KAISHA, Tokyo (JP)

(72) Inventor: Shin Fukuda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/299,634

(22) Filed: Jun. 9, 2014

(65) Prior Publication Data

US 2014/0368873 A1 Dec. 18, 2014

(30) Foreign Application Priority Data

Jun. 18, 2013 (JP) .................................. 2013-127239

(51) Int. Cl.
*G06F 3/12* (2006.01)

(52) U.S. Cl.
CPC ............ *G06F 3/1203* (2013.01); *G06F 3/1229* (2013.01); *G06F 3/1259* (2013.01); *G06F 3/1285* (2013.01); *G06F 3/1207* (2013.01); *G06F 3/1275* (2013.01)

(58) Field of Classification Search
CPC ... G06F 3/1203; G06F 3/1259; G06F 3/1229; G06F 3/1285; G06F 3/1275; G06F 3/1207; G06F 3/126

USPC ................................................ 358/1.13–1.16
See application file for complete search history.

(56) References Cited

U.S. PATENT DOCUMENTS

2006/0227373 A1* 10/2006 Matoba ........................ 358/1.15
2013/0321863 A1   12/2013 Fukuda
2014/0355031 A1* 12/2014 Fukuda ........................ 358/1.14

FOREIGN PATENT DOCUMENTS

JP          2010-50883       3/2010

\* cited by examiner

*Primary Examiner* — Marivelisse Santiago-Cordero
*Assistant Examiner* — Kent Yip
(74) *Attorney, Agent, or Firm* — Fitzpatrick, Cella, Harper & Scinto

(57) ABSTRACT

Before execution of a job, in a time that an operator cannot perform an operation, the present invention aims to notify that a setting needing an operation of the operator has been set. With this view, a control method of a printing apparatus comprises: setting the time that the operator cannot perform the operation to be performed by the operator according to the execution of the job; determining a time that an accepted job is executed; in a case where at least a part of the determined time and a part of the set time overlap each other, judging whether or not a printing setting needing an operation of the operator is included; and, in a case where it is judged that the printing setting needing the operation of the operator is included, performing the notification.

6 Claims, 15 Drawing Sheets

FIG. 6

| | 601 | 602 | 603 |
|---|---|---|---|
| | SETTING ITEM | SETTING NEEDING OPERATOR'S OPERATION | RECOMMENDED SETTING IN ABSENCE OF OPERATOR |
| 610 | HEAD PORTION CONFIRMATION PRINTING | YES | NO |
| 611 | CONFIRMATION STOP IN PRINTING JOB SETTING CONFLICT | YES | NO |
| 612 | TEMPORARY STOP AFTER PRINTING JOB | YES | NO |
| 613 | CHANGEOVER OF PAPER DISCHARGE TRAY | FOR EACH PRINTING JOB | IN FULL OF PAPERS ON PAPER DISCHARGE TRAY |

PRINTING APPARATUS, CONTROL METHOD OF PRINTING APPARATUS, AND STORAGE MEDIUM

BACKGROUND OF THE INVENTION

1. Field of the Invention

The present invention relates to a printing apparatus, a control method of the printing apparatus, and a storage medium which stores a program to perform the control method.

2. Description of the Related Art

In a printing market called a POD (print on demand), printing production or the like, a business system in which printing is performed according to orders from customers, and acquired printed and output materials are surely delivered to the customers by the appointed dates of delivery is provided.

In the field of the printing market, it is very important to perform mass printing promptly and swiftly. Consequently, an operator who exclusively performs various operations to a printing apparatus is often posted in this field.

More specifically, the operator like this exclusively performs the operations such as replenishment/exchange of expendable supplies such as papers, toners and the like, management of printing jobs, editing of job tickets, transportation of output materials, and post-processes (finishing) such as cutting, bookbinding and the like. In any case, the replenishment/exchange of the expendable supplies is the most important duty in such operator's work. This is because, if the replenishment/exchange of the expendable supplies is not properly performed, the printing apparatus falls into the state that the necessary expendable supplies are lacking during the operation of the printing job.

In such a case, it is necessary for the printing apparatus to interrupt the printing process by once stopping a printer engine. When the printing process is once interrupted, of course the printing is not restarted until the necessary expendable supply is replenished or exchanged, and, even after the printing is restarted, it takes a long time until the printing can be actually performed again because re-heating or the like is performed to the printer engine (such a state will be called downtime, hereinafter).

Under such circumstances, a method of enabling to take a necessary measure before occurrence of the downtime has been proposed. For example, Japanese Patent Application Laid-Open No. 2010-050883 discloses a method by which printing time prediction for each printing job is displayed as a graph. In this graph, a displayed color of the portion indicating a predicted time at which the replenishment/exchange of the expendable supply will become necessary is made different from others, so that the operator can previously grasp when the replenishment/exchange of the expendable supply becomes necessary. Thus, the operator can prevent the occurrence of the downtime by previously performing the replenishment/exchange of the expendable supply.

By the above method, the operator can previously predict the occurrence of the downtime due to lack of the expendable supply. However, there are some cases where the downtime occurs for a reason other than the lack of the expendable supply. As one reason, there is a printing function for which an operation by the operator is needed during printing. For example, in a head portion confirmation printing function, when printing of a plurality of copies is performed, the printing is once interrupted in the stage that the printing of the first copy is terminated. At this time, the operator confirms the content, the quality and the like of the printed head portion of the first copy. Then, if the operator judges that there is no problem if the printing of the remaining copies is performed, the printing is restarted and continued in response to the operator's instruction, and then the printing of all the copies is completed. Besides, as another reason, there is a function by which printed materials (output materials) are output to a different paper discharge tray for each printing job.

It is possible by using this function to prevent that the outputs materials of the different printing jobs are mixedly stacked on the one paper discharge tray. However, in a state that the output materials of the printing jobs previously output still remain in all the paper discharge trays of the printing apparatus, the printing is once interrupted because the printing cannot be continued. In this case, if the operator removes the remaining output materials from any of the paper discharge trays, then the temporarily interrupted printing is restarted. In other words, it is necessary for the operator to appropriately remove the output materials to prevent that all the paper discharge trays are filled with the output materials. In any case, the above functions are very useful if the operator standing by the printing apparatus can immediately and easily operate and handle the printing apparatus.

However, there is a case where the operator has to be away from the printing field due to some reasons such as other business, a meeting and the like. Under such circumstances, if the above functions are executed while the operator is being away from the printing field, the printing apparatus comes to be in a temporary suspension state until the operator goes back to the printing field and again operates and handles the printing apparatus, and thus the downtime occurs resultingly. For this reason, when the operator intends to move away from the printing field, he/she has to, before actually moving, confirm the printing apparatus such that these functions cannot be executed in operator's absence. However, it takes much time for the work of confirming whether or not these functions are executable during the operator's absence and of performing setting changes as necessary.

SUMMARY OF THE INVENTION

The present invention has been completed in order to solve such a problem as described above, and an object thereof is to provide a printing apparatus which is characterized by comprising: a setting unit configured to set a time that an operator cannot perform an operation to be performed by the operator according to execution of a job; a determining unit configured to determine a time that an accepted job is executed; a judging unit configured to, in a case where at least a part of the time determined by the determining unit and a part of the time set by the setting unit overlap each other, judge whether or not a printing setting needing an operation of the operator is included; and a notifying unit configured to, in a case where it is judged by the judging unit that the printing setting needing the operation of the operator is included, perform notification.

Further features of the present invention will become apparent from the following description of exemplary embodiments with reference to the attached drawings.

BRIEF DESCRIPTION OF THE DRAWINGS

FIG. 6 is a diagram illustrating an example of a table of setting information to be managed by the printing apparatus.

DESCRIPTION OF THE EMBODIMENTS

Preferred embodiments of the present invention will now be described in detail with reference to the attached drawings.

Description of System Configuration

First Embodiment

Figure 1:
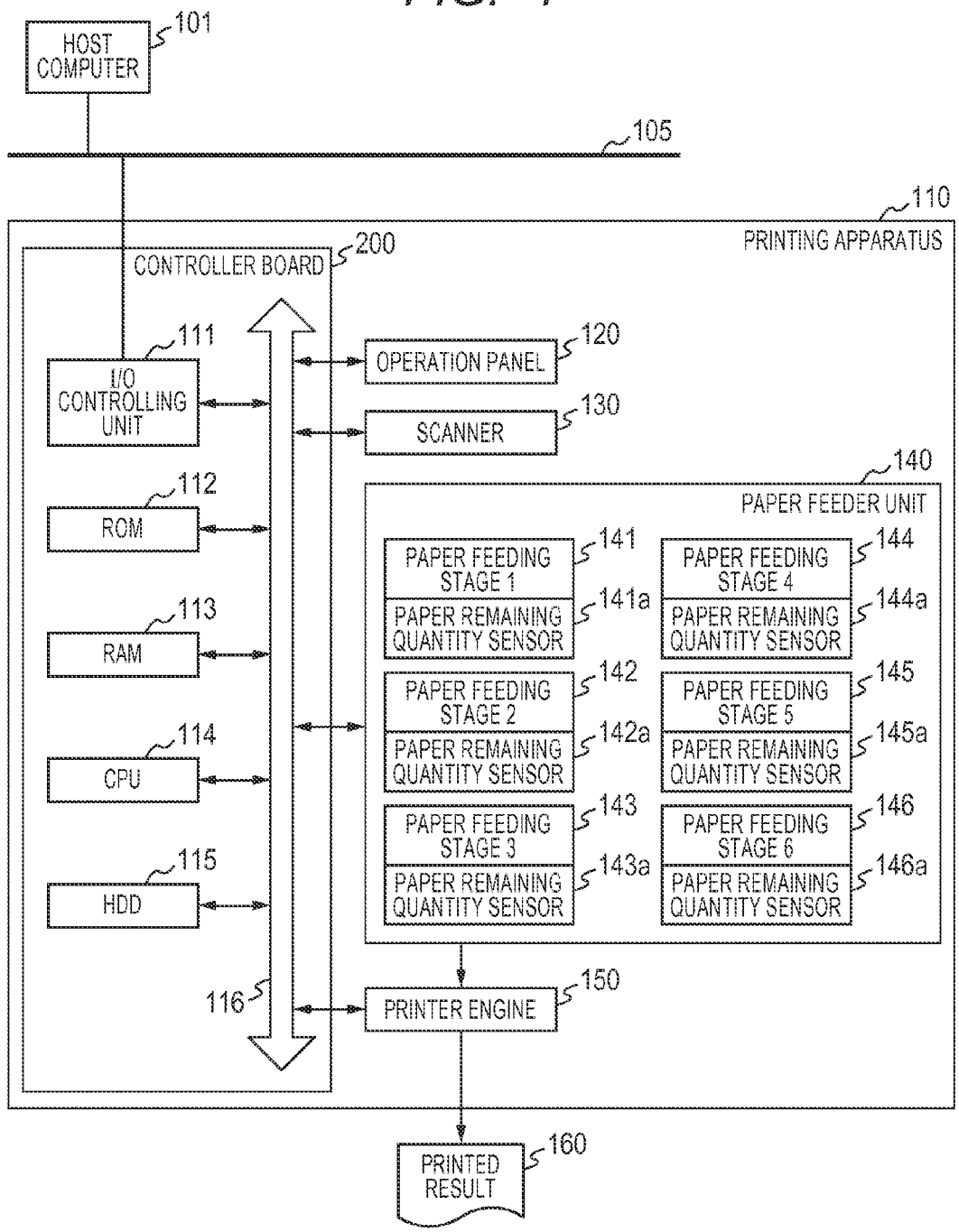
FIG. 1 is a block diagram illustrating a configuration of printing system to which a printing apparatus according to the present invention is applied.

FIG. 1 is a block diagram illustrating a configuration of printing system to which a printing apparatus indicating the embodiment of the present invention is applied. As long as a notice is not specially given, if the function of the present invention is executed, the present invention can be applied even if it is such a system, where a connecting operation is performed through a LAN (local area network), a WAN (wide area network) or the like and a process is executed. As illustrated in FIG. 1, the printing system according to the present embodiment is composed of a host computer 101 and a printing apparatus 110. The host computer 101 and the printing apparatus 110 are respectively connected with each other through a communication line 105. Incidentally, in the present invention, there is no problem if a plurality of host computers, printing apparatuses and the like are connected with each other.

In FIG. 1, the host computer 101 acquires input information from a user by operating an input device (not illustrated), creates a printing job to be transmitted to the printing apparatus 110 and can transmit that created job to the printing apparatus. A controller board 200 performs various data processes and controls an operation of the printing apparatus 110. An operation panel 120, which is on a touch-panel basis, accepts various operations from the user. A scanner 130 scans an original document by use of an optical sensor and acquires the scanned image data. A paper feeder unit 140 is a paper feeding device composed of a plurality of paper feeding stages. A printer engine 150 physically prints image data on a printing paper. Reference numeral 160 denotes a printed result.

Next, the constitution of the controller board 200 will be described. An I/O (input/output) controlling unit 111 performs a communication control with an external network. A ROM (read-only memory) 112 stores various control programs. A RAM (random access memory) 113 reads out the control programs stored in the ROM 112 and records the control programs. A CPU (central processing unit) 114 executes the control programs read out by the RAM 113 and comprehensively controls image signals and various devices. An HDD (hard disk drive) 115 is used for the purpose of holding a large amount of data such as image data, print data or the like temporarily or for a long term. The modules are respectively connected with each other through a system bus 116. Further, the system bus 116 connects the controller board with each of devices in the printing apparatus 110.

The RAM 113 also functions as a main memory and a work memory of the CPU 114. In addition, the control programs and an operating system are also stored in the HDD 115 other than the ROM 112. Further, the controller board may have an NVRAM (nonvolatile RAM) (not illustrated) and printing apparatus mode setting information from the operation panel 120 may be stored in the NVRAM.

The paper feeder unit 140 is composed of a plurality of paper feeding stages. It is constituted that a paper feeding stage such as an optional external paper feeding stage or a manual paper feeding stage is also included in the paper feeder unit 140 other than the paper feeding stages provided in a printing apparatus main body itself. In the present embodiment, it is assumed that six paper feeding stages from a paper feeding stage 141 to a paper feeding stage 146 (hereinafter, they will be called paper feeding stages 1 to 6) exist in total. It is possible that printing papers are held in each of the paper feeding stages. Paper remaining quantity sensors (a paper remaining quantity sensor 141a to a paper remaining quantity sensor 146a) are respectively provided in each of the paper feeding stages, and the paper remaining quantity of the respective paper feeding stages can be detected. In the each paper feeding stage, only the uppermost paper of the held papers is separated and that separated paper can be transported to the printer engine 150.

Figure 2:
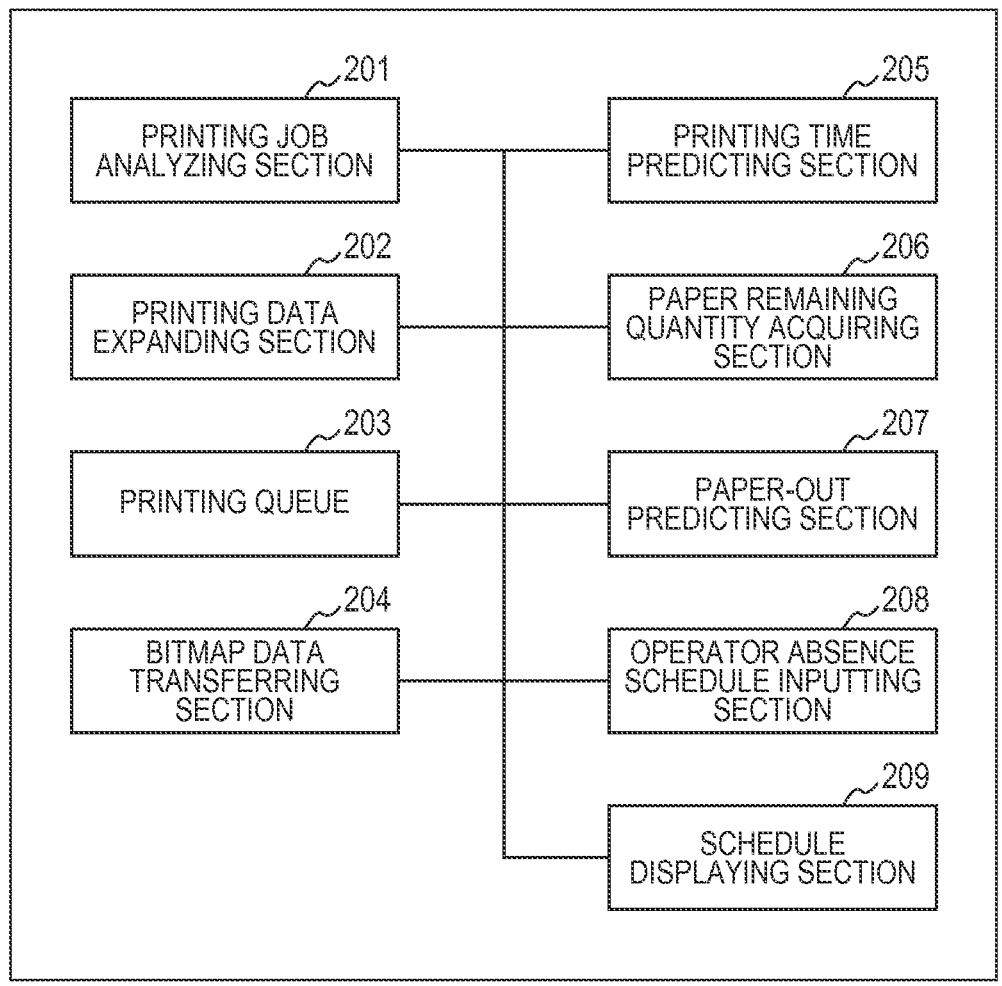
FIG. 2 is a block diagram illustrating a configuration of a software module of the printing apparatus.

FIG. 2 is a block diagram illustrating a configuration of the software modules of the printing apparatus 110 illustrated in FIG. 1. These software modules arranged in the controller board 200 are stored in the ROM 112 or the HDD 115 and read out by the RAM 113 in accordance with necessity to be executed by the CPU 114.

In FIG. 2, a printing job analyzing section 201 analyzes various printing jobs accepted at the printing apparatus 110 such as a printing job transmitted from the host computer 101, a copying job generated at the printing apparatus 110 and the like and reads out the printing setting included in the printing job. The printing setting mentioned here mainly indicates information related to the paper feeding such as the paper size and a paper type to be used in the printing operation, a paper feeding stage and the like and information related to finishing processes such as the single-sided/double-sided printing, the stapling/bookbinding setting and the like. The printing setting read out by the printing job analyzing section 201 is once stored in a storage device such as the RAM 113 or the HDD 115. A printing data expanding section 202 expands printing image data included in the various printing jobs accepted at the printing apparatus 110 into bitmap data which can be printed by the printer engine 150.

The printing image data transmitted from the host computer 101 is usually described with the PDL (Page Description Language), and the PDL is expanded into bitmap data. When the printing image data is previously expanded into bitmap data by the host computer 101 or the like, the printing data expanding section 202 performs only the color conversion process for converting image data into a color space corresponding to the printer engine 150. In case of a copying job generated at the printing apparatus 110, the scanned image data read by the scanner 130 is expanded into bitmap data. The bitmap data generated by the printing data expanding section 202 is once stored in a storage device such as the HDD 115 or the like.

All the printing jobs accepted at the printing apparatus 110 are processed at the printing job analyzing section 201 and the printing data expanding section 202, and the processed information is transmitted to a print queue 203 at the same time to be integratedly managed. In the print queue 203, the printing order is controlled for a printing job to be managed, and a printing process is advanced in accordance with the predetermined order. The printing job, of which a printing operation was completed, is deleted from the print queue 203. A bitmap data transferring section 204 transfers the bitmap data generated by the printing data expanding section 202 to the printer engine 150 in accordance with the timing that a printing paper is transported from the paper feeder unit 140 to the printer engine 150. A printing time predicting section 205 predicts a time taken in completing the printing for page groups in an optional printing job or a printing job currently performed.

Prediction of the printing time is performed by using the printing setting of the printing job read out by the printing job analyzing section 201 and the processing capacity of the printer engine 150. Here, the processing capacity of the printer engine 150 indicates the printing speed, a processing time taken in switching the paper size/type, various engine adjustments, a processing time taken in performing the cleaning, a processing time taken in performing a finishing process and the like. A paper remaining quantity acquiring section 206 communicates with the paper feeder unit 140 and acquires information of the paper size/type, the paper remaining quantity and the like which are set for each of the paper feeding stages. The acquired various information is once stored in the storage device such as the RAM 113, the HDD 115 or the like. A paper-out predicting section 207 predicts whether or not a paper-out state occurs in the course of performing the printing of a printing job every paper to be used by the printing jobs accumulated in the print queue 203. The judgment whether or not the paper-out state occurs is performed by comparing the quantity of papers to be used by the printing jobs accumulated in the print queue 203 with the paper remaining quantity of which information was acquired by the paper remaining quantity acquiring section 206. When it is judged that a paper-out state occurs, the paper-out predicting section 207 predicts the time of occurring the paper-out state by using the printing time predicting section 205. An operator absence schedule inputting section 208 accepts an input of the absence schedule from an operator. A screen example of the operator absence schedule inputting section 208 will be described with reference to FIG. 4.

A schedule displaying section 209 displays a schedule screen on the operation panel 120. Here, the schedule screen indicates an interface screen, which is displayed in order to inform a fact that the printing jobs accumulated in the print queue 203 are printed with what order and printed at what time respectively. Additionally, an absence schedule of an operator, which was input by the operator absence schedule inputting section 208, is also displayed. A screen example of the schedule displaying section 209 will be described later with reference to FIG. 3. In a printing system having the above constitution, a flow of the process when an operator inputs the absence schedule will be described.

Figure 3:
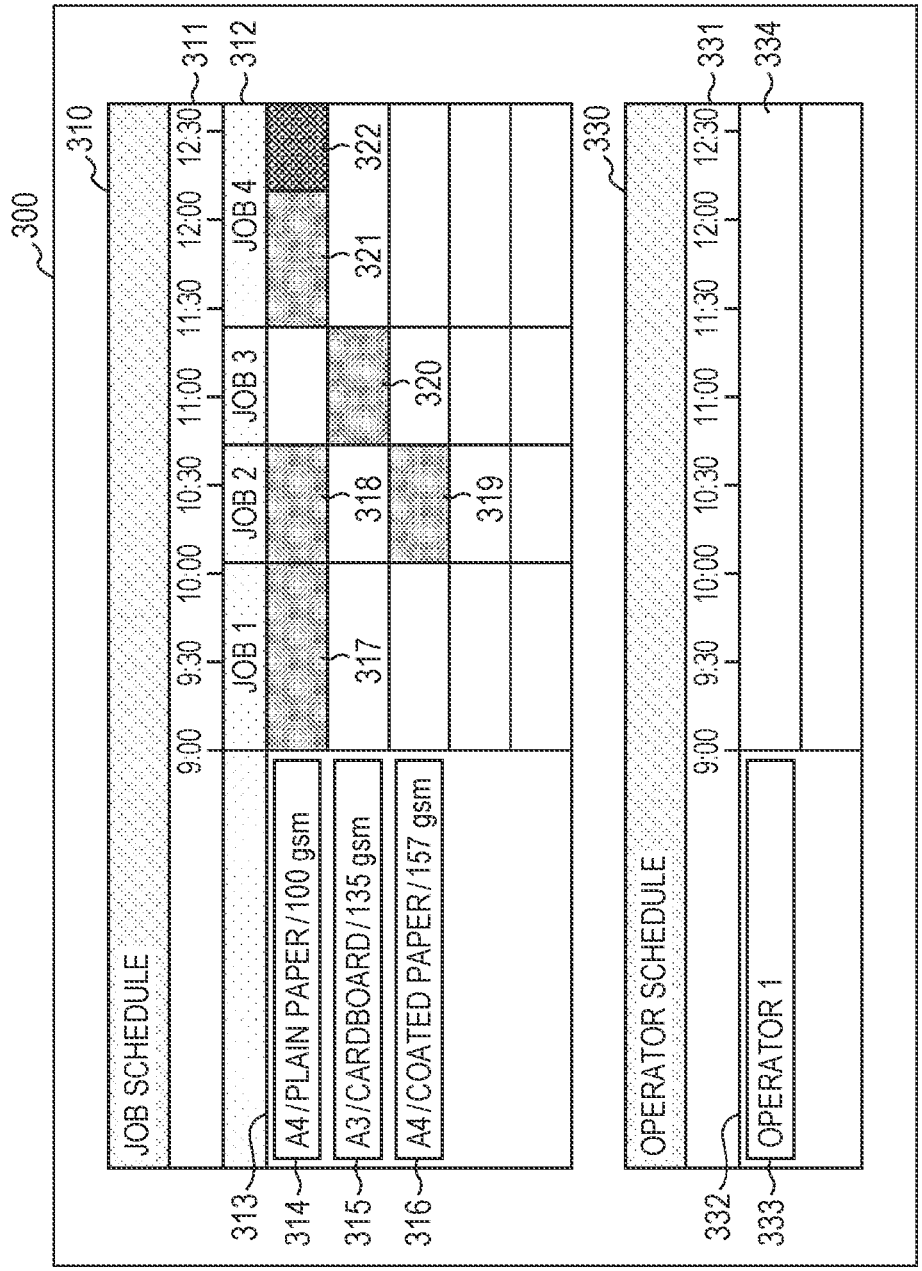
FIG. 3 is a diagram illustrating an example of a schedule screen to be displayed on an operation panel.

FIG. 3 is a diagram illustrating an example of the schedule screen to be displayed on the operation panel 120 illustrated in FIG. 1. In the present example, the schedule screen is displayed on the display part of the operation panel 120 by a manner that processes in the schedule displaying section 209 are executed by the CPU 114.

In FIG. 3, reference numeral 300 denotes the whole of an interface screen to be displayed on the operation panel 120. A table 310, which indicates a schedule, displays states of printing jobs JOB 1 to JOB 4 accumulated in the print queue 203. In the table 310, a lateral axis 311 is a time-of-day scale which represents a time of day. A row 312 indicates the printing jobs predicted to be performed the printing within periods of time indicated by the lateral axis 311. In FIG. 3, a state that the four printing jobs JOB 1 to JOB 4 are displayed is indicated. As for each of the printing jobs, width thereof to be displayed is changed in accordance with the printing time to be predicted by the printing time predicting section 205. An operator can judge a prediction that what printing job is started from what time and finished by what time by referring to the lateral axis 311 and the row 312.

A column 313 indicates information of papers to be consumed in case of performing the printing of the printing jobs indicated in the row 312. The kind of paper and the number of papers to be displayed on the column 313 are changed in accordance with the printing job to be displayed. In FIG. 3, a state that three kinds of papers 314 to 316 are displayed is indicated. Reference numerals 317 to 322 denote display units which zonally indicate periods of time, in which the papers displayed on the column 313 are consumed.

The display units are displayed with different colors and hatchings in accordance with the paper remaining quantity. In FIG. 3, the display units 317 to 321 are displayed with the hatching different from that of the display unit 322. The display units 317 to 321 indicate that papers exist when the printing is performed. On the other hand, the display unit 322 indicates that it is predicted by the paper-out predicting section 207 that the paper-out will occur when the printing is performed. In a case that the paper remaining quantity was changed, for example, a case that an operator fed papers to the paper feeding stage or a case that the paper exchange was performed, these display units are updated in accordance with the paper remaining quantity after the change. The operator can previously judge the prediction that what kind of paper will lack at what time by referring to these display units.

A table 330 indicates a schedule of an operator who operates the printing apparatus 110. In the table 330, a lateral axis 331 is a time-of-day scale which represents a time of day. A column 332 is used for indicating an operator. In FIG. 3, although only the one operator referred to as "OPERATOR 1" is displayed in the column 332 as reference numeral 333, a plurality of operators are to be displayed here in case of existing a plurality of operators who operate the printing apparatus. An area 334 is used for indicating a schedule of an operator to be displayed on a left side.

In FIG. 3, a state that a schedule of the operator is not input is indicated. The operator can display a dialog screen as illustrated in FIG. 4 used for inputting an absence schedule of the operator by tapping on an arbitrary position of the area 334.

Figure 4:
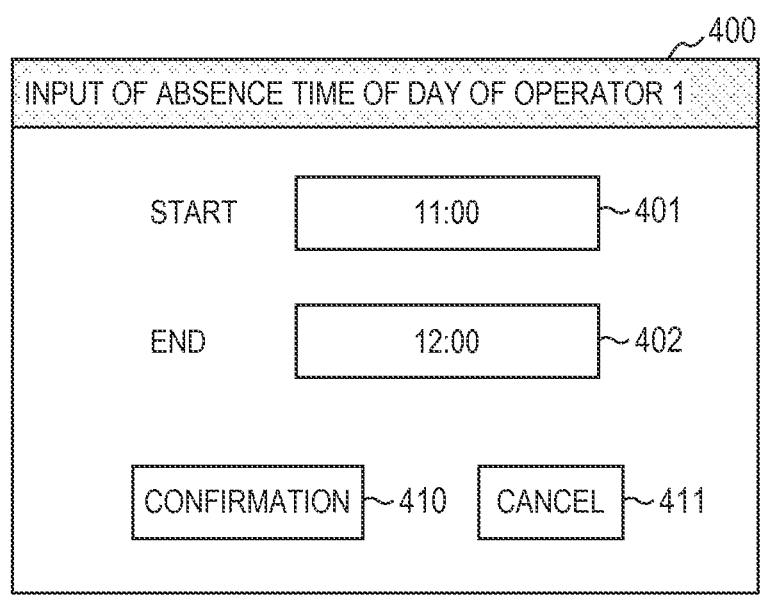
FIG. 4 is a diagram illustrating an example of a UI (user interface) screen to be displayed on the operation panel.

FIG. 4 is a diagram illustrating an example of a UI (user interface) screen to be displayed on the operation panel 120 illustrated in FIG. 1. The present example is an example of a dialog screen used for inputting the absence schedule of the operator. In FIG. 4, reference numeral 400 denotes the whole of a dialog screen, which is displayed on the operation panel 120 by a manner that processes in the operator absence schedule inputting section 208 are executed by the CPU 114. In FIG. 4, a state that the dialog screen 400 is displayed after tapping on the area 334 in FIG. 3 is indicated as an example.

Figure 7:
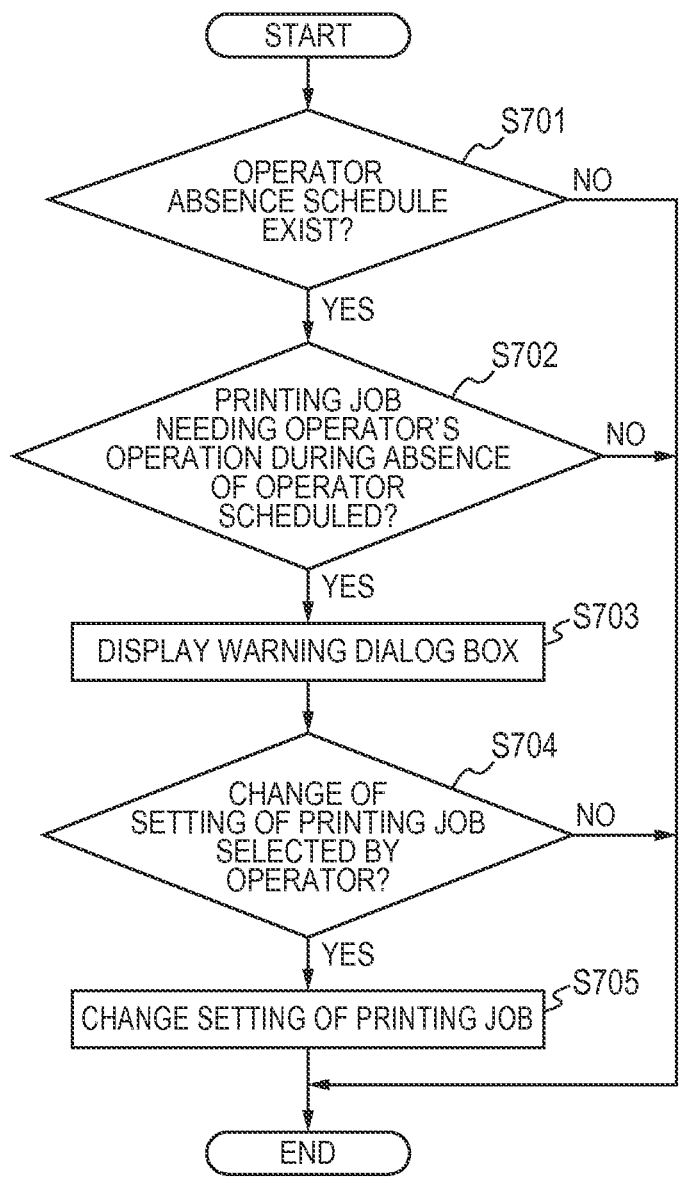
FIG. 7 is a flow chart for describing a control method of the printing apparatus.

Reference numeral 401 denotes a start time of day for the absence schedule and reference numeral 402 denotes an end time of day for the absence schedule. As for these times of day, an operator can input an arbitrary time of day by using a software keyboard (not illustrated), ten keys provided with the operation panel 120 or the like. In FIG. 4, a state that the time 11:00 is designated for an absence start time of day and the time 12:00 is designated for an absence end time of day is indicated. When a confirmation button 410 is depressed, the absence schedule of an operator, which was input, is determined at that time, and that schedule is stored in the HDD 115 or the RAM 113. Thereafter, the dialog screen 400 is closed to be returned to the schedule screen 300, and a process to be described in FIG. 7 is executed. When a cancel button 411 is depressed, an inputting process of the absence schedule of an operator is stopped, and the dialog screen 400 is closed to be returned to the schedule screen 300.

Figure 5:
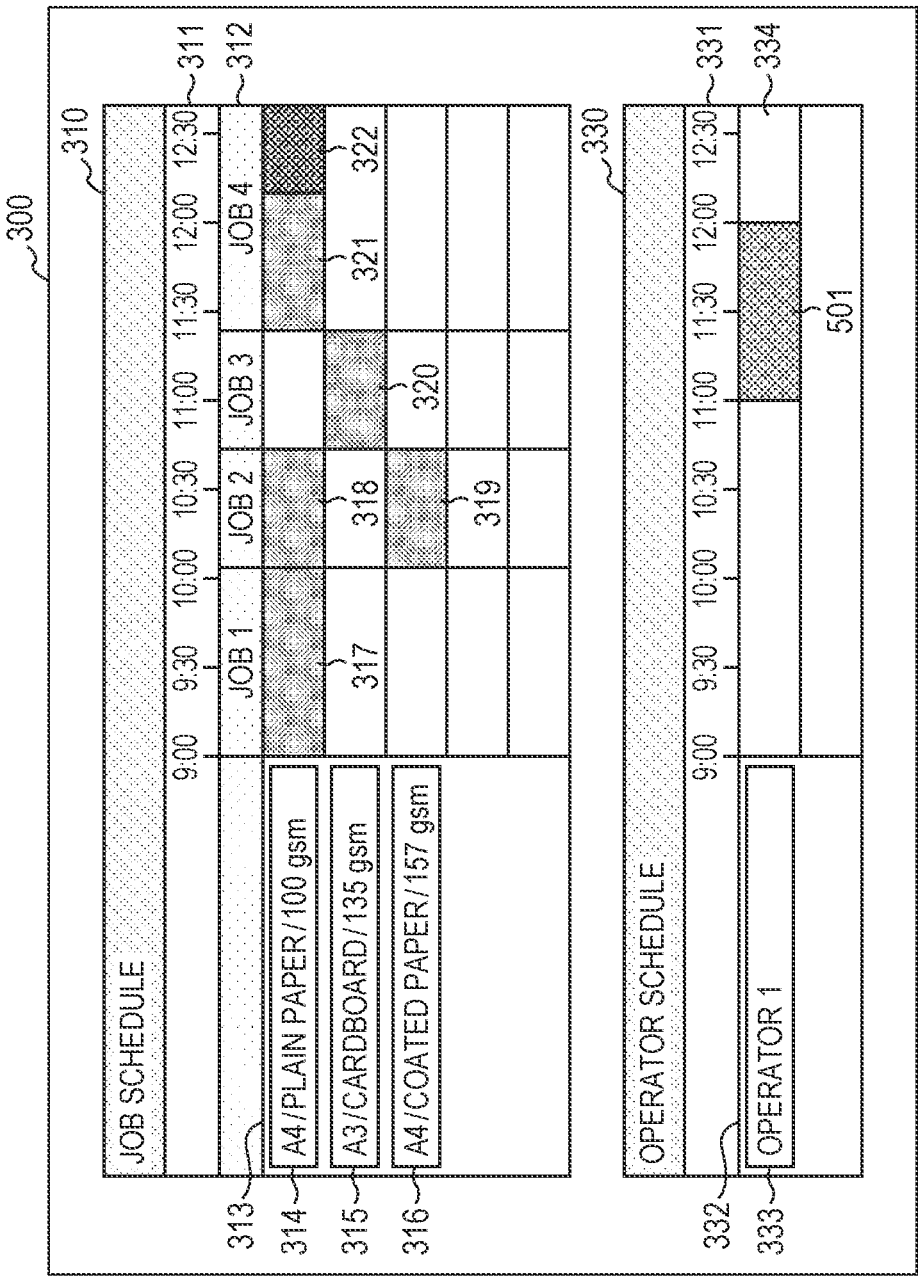
FIG. 5 is a diagram illustrating an example of the schedule screen to be displayed on the operation panel.

FIG. 5 is a diagram illustrating an example of a schedule screen to be displayed on the operation panel 120 illustrated in FIG. 1. The present example is an example of the schedule screen 300 after that the operator input the absence schedule indicated in FIG. 4. In this screen example, an absence schedule, which was input by the operator by using the dialog screen illustrated in FIG. 4, is displayed in the area 334 as a part 501 as compared with the printing schedule screen illustrated in FIG. 3.

FIG. 6 is a diagram illustrating an example of a table which manages the setting information to be managed by the printing apparatus indicating the present embodiment. The present example relates to a table which indicates the printing job setting, which needs an operation of operator, or the device setting. This table is stored in the HDD 115 or the RAM 113 as a part of control software of the printing apparatus and referred by the CPU 114. In the present embodiment, a case that the head portion confirmation printing and the confirmation stop in the printing job setting conflict are registered in the HDD 115 as setting items is indicated.

In FIG. 6, a column 601 represents setting items of the printing job setting or the device setting. A column 602 represents the settings which need an operation of operator in the setting items indicated in the column 601. A column 603 represents recommended setting items which are recommended in absence of the operator in the setting items indicated in the column 601. The setting recommended in absence of the operator is, in other words, the setting which does not need an operation of operator. Rows 610 to 613 respectively represent the settings, which need operations of operator, to be carried out. In FIG. 6, although the four settings of rows 610 to 613 are indicated, these settings are simply treated as an example, and as to a matter related to what kind of the setting exists as the setting which needs an operation of operator, it usually becomes a different matter in accordance with a model of the printing apparatus, software or the like.

The row 610 represents the printing setting item (setting item for confirming a head portion printed result) which corresponds to "the head portion confirmation printing". When the head portion confirmation printing has been set to "YES", the printing is temporarily interrupted at the stage that a first one copy has been printed in a case that a plurality of copies are printed. Thereafter, when the operator judged that there is not a problem if the remaining copies are printed after confirming the contents and quality of the printed head portion, the printing is restarted by instructing the printing continuity. On the other hand, when the head portion confirmation printing has been set to "NO", all the copies are continuously printed without interruption.

The row 611 represents the setting of "the confirmation stop in the printing job setting conflict". When the confirmation stop in the printing job setting conflict has been set to "YES", a dialog box for urging the printing setting change is displayed for an operator just before starting the printing in a case that the printing setting, which cannot coexist with another setting, is applied in the printing job. Here, the printing setting, which cannot coexist with another setting, corresponds to a combination of the physically impossible finishing setting and a paper discharging tray, a combination of the prohibited paper and the finishing setting or the like.

After the operator changed the printing setting on the above dialog box, the printing of that printing job is first started. On the other hand, when the confirmation stop in the printing job setting conflict has been set to "NO", the printing is started without displaying the dialog box even in a case that the printing setting, which cannot coexist with another setting, exists in the printing job. In this case, the printing job, which obeys a predetermined rule, is output with a state that the either setting among the printing settings, which cannot coexist with another setting, is ignored or changed to the default setting.

The row 612 represents the setting of "the temporary stop after the printing job". When the temporary stop after the printing job has been set to "YES", the printing is interrupted every completion of the printing job. Next, in order to perform the printing of a scheduled printing job, an operation that an operator instructs to restart the printing is needed every time. On the other hand, when the temporary stop after the printing job has been set to "NO", the printing is continuously performed without interrupting the printing job.

The row 613 represents the setting of "the changeover of the paper discharge tray". When the changeover of paper discharge tray has been set to "for each printing job", papers are discharged to different paper discharge tray for each printing job. If a state that the output material of the printing job previously output remains on all the paper discharge trays of the printing apparatus appears, since a paper discharging process cannot be continued, the printing is temporarily interrupted.

In this case, the printing, which was temporarily interrupted, is restarted by a manner that the operator removes the output material from the either paper discharge tray. On the other hand, when the changeover of paper discharge tray has been set to "in full of papers on the paper discharge tray", the output material of the different printing job is also stacked on the same paper discharge tray. When the output material has been fully stacked on the paper discharge tray, the papers are continuously discharged to the other empty paper discharge tray. When the output material has been fully stacked on all the paper discharge trays, since a paper discharging process cannot be continued, the printing is interrupted. Naturally, the frequency of interruption of the printing because of discontinuity of the paper discharging process becomes an extremely low level in a case that the changeover of paper discharge tray has been set to "in full of papers on the paper discharge tray" as compared with a case that the changeover of paper discharge tray has been set to "for each printing job".

FIG. 7 is a flow chart for describing a control method of the printing apparatus indicating the present embodiment. The present example is an example of a printing job setting process of the printing apparatus 110 when the confirmation button 410 is depressed. Each of steps is realized by a process that the CPU 114 executes control programs stored in the ROM 112 and the HDD 115.

In a step S701, the CPU 114 confirms information stored in the HDD 115 or the RAM 113 and judges whether or not the stored absence schedule of the operator exists. When the CPU 114 judged that the absence schedule of the operator exists, a flow advances to a step S702. When the CPU 114 judged that the absence schedule of the operator does not exist, a series of processes is terminated. In the step S702, the CPU 114 judges whether or not a printing job which needs an operation of operator is scheduled during absence of the operator.

This judgment is given according to a fact whether or not there is the setting which coincides with the setting, which needs an operation of operator indicated in a table of FIG. 6, in the printing job setting of the printing job scheduled during the absence or the device setting. When the CPU 114 judged that the printing job, which needs an operation of operator, is scheduled during absence of the operator, a flow advances to a step S703. When the CPU 114 judged that the printing job, which needs an operation of operator, is not scheduled, a series of processes is terminated. In the step S703, the CPU 114 displays a warning dialog box as described in FIG. 8 on the display part of the operation panel 120. Thereby, the CPU 114 notifies a fact that the printing job setting which needs an operation of operator or the device setting has been applied during absence of the operator to a user, and a flow advances to a step S704. In the step S704, the CPU 114 judges whether or not the operator selects the setting change of the printing job in the dialog box displayed on the display part of the operation panel 120 in the step S703.

When the CPU 114 judged that the operator selected the setting change of the printing job, a flow advances to a step S705. When the CPU 114 judged that the operator did not select the setting change of the printing job, a series of processes is terminated. In the step S705, the CPU 114 executes the setting change selected in the dialog box displayed in the step S703, and a series of processes is terminated.

It has been described that the process described in FIG. 7 is executed when the operator input the absence schedule. However, the process described in FIG. 7 may be executed when the printing schedule was changed by some reason also in other case. For example, there is such a case as "a printing job is newly added to a print queue 203", "an operator manually changed the printing order of a printing job", "a printing schedule of a printing job is shifted as a result of error generation" or the like.

Figure 8:
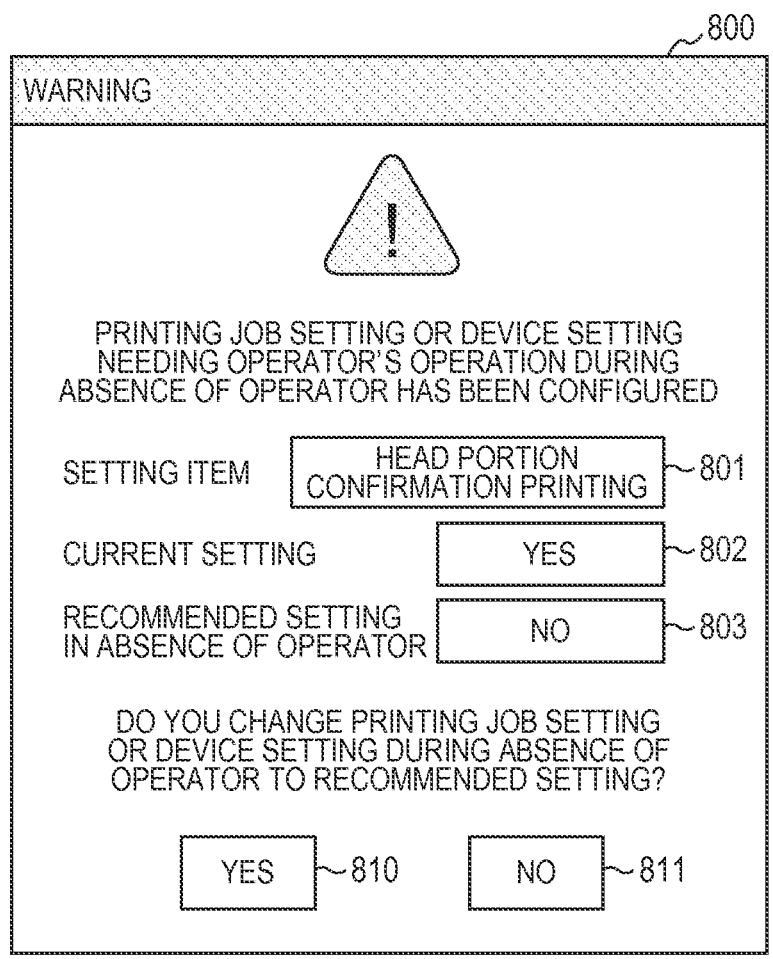
FIG. 8 is a diagram illustrating an example of the UI screen to be displayed on the operation panel.

FIG. 8 is a diagram illustrating an example of the UI screen to be displayed on the operation panel 120 illustrated in FIG. 1. The present example is an example of the UI screen indicating the warning dialog box to be displayed in the step S703 in a flow chart described in FIG. 7. In FIG. 8, reference numeral 800 denotes the whole of a warning dialog box, which is displayed on the operation panel 120 by the CPU 114. Reference numerals 801 to 803 respectively denote text boxes. In the text box 801, a setting item, which was judged to be coincided with the setting, which needs an operation of operator indicated in the table of FIG. 6, in the printing job setting of the printing job scheduled during absence of the operator or the device setting in the step S702, is displayed. In the text box 802, the setting, which is currently set (that is, the setting which needs an operation of operator) in the setting item indicated in the text box 801, is displayed. In the text box 803, the setting, which is recommended during absence of the operator (the setting indicated in the column 603 in the table of FIG. 6) in the setting item indicated in the text box 801, is displayed. In FIG. 8, the warning dialog box, which is displayed when the setting of the head portion confirmation printing has been set to "YES" in the printing job scheduled during absence of the operator, is displayed as an example.

Buttons 810 and 811 are used for accepting whether or not the operator selects the setting change of the printing job, and when the either button is depressed, the warning dialog box 800 is closed. Here, when the button 810 is depressed, the CPU 114 judged that the operator selected the setting change of the printing job in the step S704. Thereafter, in the step S705, the CPU 114 changes the setting of the setting item displayed in the text box 801 to the setting displayed in the text box 803. On the other hand, when the button 811 is depressed, the CPU 114 judges that the operator did not select the setting change of the printing job in the step S704.

According to the above printing system, when it was judged that the printing job, which needs an operation of operator, is scheduled during absence of the operator, it becomes possible to display a warning dialog box before the operator becomes absent. Further, it becomes possible that the operator can change the setting to the recommended setting in absence of the operator by using the above warning dialog box. Therefore, since the operator can reduce the possibility of generating the down time during the absence, the usability is improved.

Second Embodiment

In the first embodiment, when it was judged that the printing job, which needs an operation of operator, is scheduled during absence of the operator, the warning dialog box was displayed before the operator becomes absent. Although it becomes possible that the operator changes the setting to the recommended setting in absence of the operator by using the warning dialog box, such a trouble as manually operating the warning dialog box occurs even in a case that the operator inevitably desires to change the setting to the recommended setting. Therefore, in the present embodiment, an example, where a printing process can be performed after automatically changing the setting to the recommended setting in absence of the operator when the operator is in an absent state, will be described.

Figure 9:
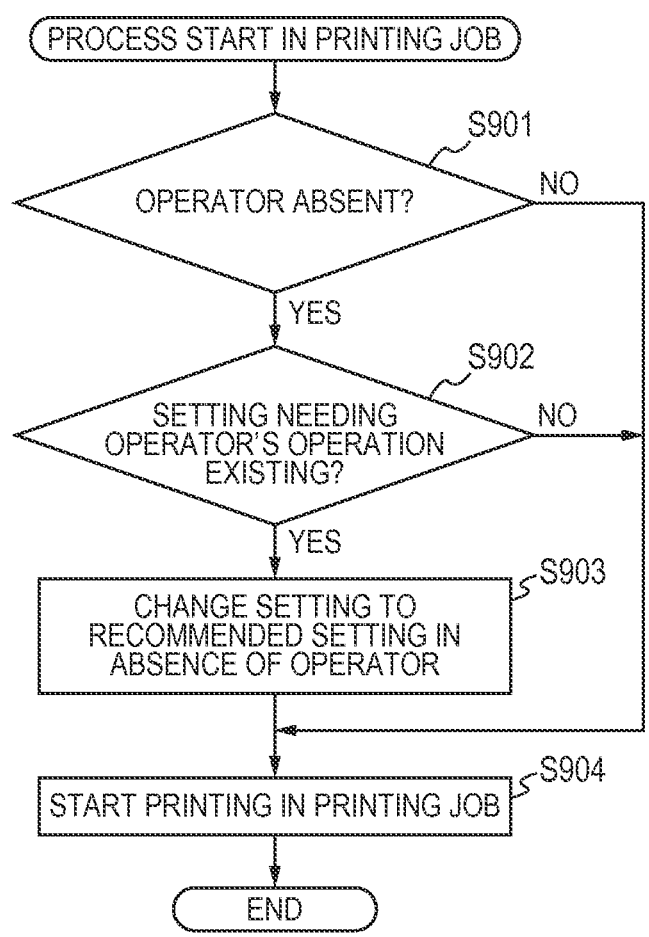
FIG. 9 is a flow chart for describing a control method of the printing apparatus.

In the present embodiment, only the part which is different from a part of the first embodiment will be described, and it will be described by using the same reference numeral for the same constitution. The schematic hardware constitution and the software module configuration of a printing system according to the second embodiment are respectively similar to those described in FIGS. 1 and 2 of the first embodiment. FIG. 9 is a flow chart for describing a control method of a printing apparatus indicating the present embodiment. The present example is a processing example, where the printing apparatus 110 executes each of printing jobs. Each of steps is realized by a process that the CPU 114 executes control programs stored in the ROM 112 and the HDD 115.

In a step S901, the CPU 114 confirms an operator absence schedule stored in the HDD 115 or the RAM 113, and judges whether or not the operator is absent at the present time. When it was judged that the operator is absent, a flow advances to a step S902. When it was judged that the operator is not absent, a flow advances to a step S904. In the step S902, the CPU 114 judges whether or not the setting which needs an operation of operator is applied for a printing job which starts the printing from this time. This judgment is given according to a fact whether or not there is the setting which coincides with the setting, which needs an operation of operator indicated in the table of FIG. 6, in the printing job setting of the printing job which starts the printing from this time or the device setting.

When the CPU 114 judged that the setting, which needs an operation of operator, is applied, a flow advances to a step S903. When the CPU 114 judged that this setting is not applied, a flow advances to the step S904. In the step S903, the CPU 114 changes the setting to the recommended setting in absence of the operator indicated in the table of FIG. 6 for the setting, which needs an operation of operator, judged in the step S902, and a flow advances to the step S904. In the step S904, the CPU 114 starts the printing of the printing job, and a series of processes is terminated.

According to the above printing system, when the printing of the printing job, which needs an operation of operator during absence of the operator, is performed, it becomes possible to perform the printing after automatically changing the setting to the printing setting which does not need an operation of operator. Therefore, since the operator can save a trouble that the change of the printing job setting or the device setting is manually performed, the usability is improved.

Third Embodiment

In the first and second embodiments, as an example of the printing job setting which needs an operation of operator, it has been described by exemplifying the head portion confirmation printing. In this case, when the printing job, where the head portion confirmation printing has been set to "YES", was scheduled during absence of the operator, the down time generation during absence of the operator was avoided by an operation that the head portion confirmation printing is changed to set to "NO". But, if the head portion confirmation printing is set to "NO", the initially planned confirmation of output contents and quality of the head portion to be performed by the operator cannot be performed.

Therefore, in the present embodiment, it will be described about an example, where it becomes possible to perform the confirmation printing of a head portion of the printing job before the operator becomes absent, in a case that the printing job, where the head portion confirmation printing has been set to "YES" during absence of the operator, is scheduled.

In the present embodiment, only the parts different from those of the first and second embodiments will be described, and the same constitution as that of the first and second embodiment will be described by using the same reference numeral. Incidentally, the schematic hardware constitution and the software module configuration of a printing system indicated in the third embodiment are respectively similar to those in FIGS. 1 and 2 described in the first embodiment.

Figure 10:
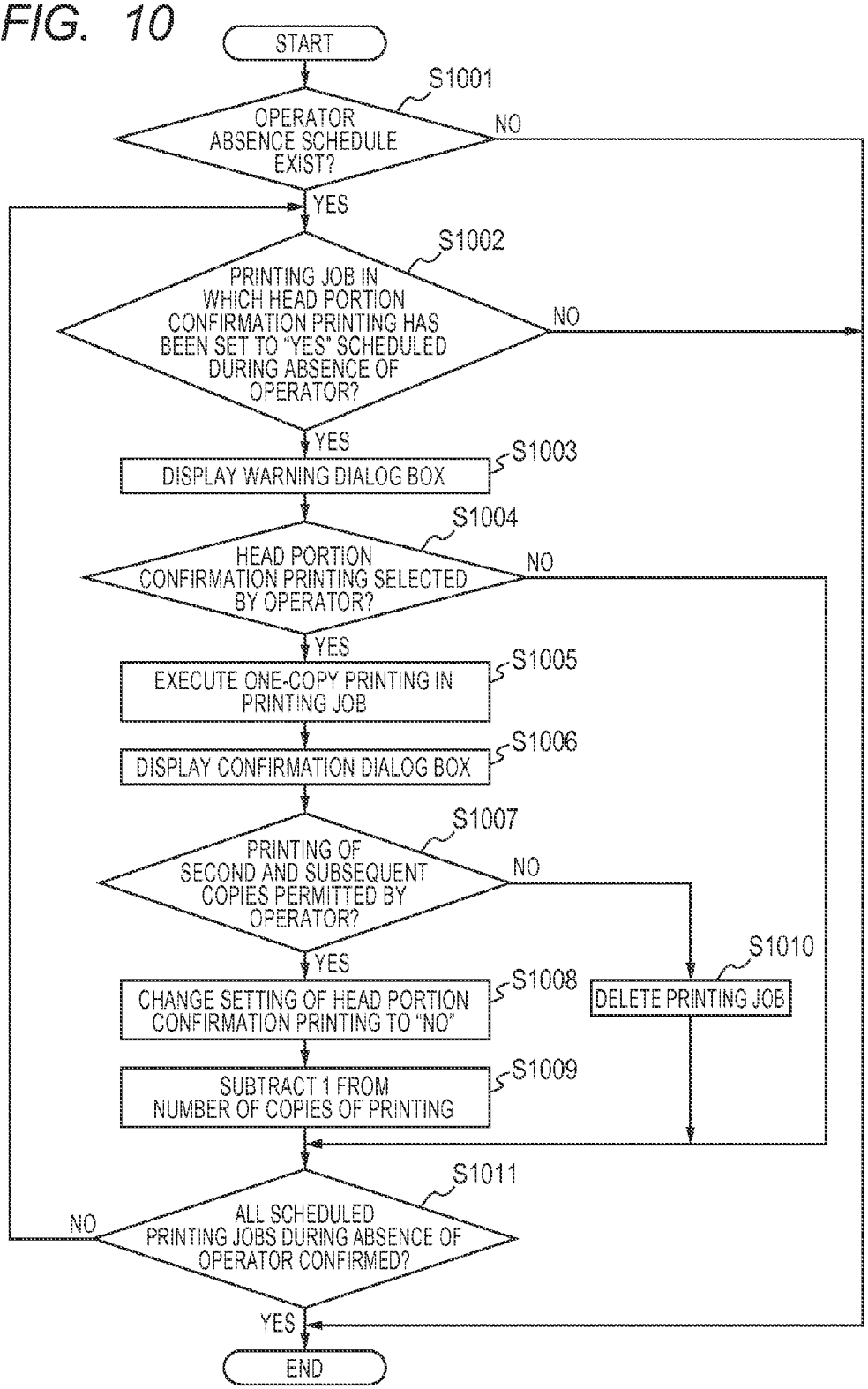
FIG. 10 is a flow chart for describing a control method of the printing apparatus.

FIG. 10 is a flow chart for describing a control method of the printing apparatus indicating the present embodiment. The present example is a processing example of the printing apparatus 110 in a case that the confirmation button 410 is depressed in a dialog screen illustrated in FIG. 4. Each of the steps is realized by a process that the CPU 411 executes control programs stored in the ROM 112 and the HDD 115.

In a step S1001, the CPU 114 confirms information stored in the HDD 115 or the RAM 113 and judges whether or not the stored absence schedule of the operator exists. When it was judged that the absence schedule of the operator exists, a flow advances to a step S1002. When it was judged that this absence schedule does not exist, a series of processes is terminated.

In a step S1002, the CPU 114 judges whether or not the printing job, where the head portion confirmation printing has been set to "YES" during absence of the operator, is scheduled. When the CPU 114 judged that the printing job, where the head portion confirmation printing has been set to "YES" during absence of the operator, is scheduled, a flow advances to a step S1003. When the CPU 114 judged that this printing job is not scheduled, a series of processes is terminated. In the step S1003, the CPU 114 displays a warning dialog box as described in FIG. 11 on the display part of the operation panel 120, and a flow advances to a step S1004.

In the step S1004, the CPU 114 judges whether or not the operator immediately selected to perform the head portion confirmation printing in the dialog box displayed in the step S1003. When the CPU 114 judged that the operator selected to perform the head portion confirmation printing, a flow advances to a step S1005. When the CPU 114 judged that the operator did not select to perform the head portion confirmation printing, a flow advances to a step S1011. In the step S1005, the CPU 114 performs to print one copy of the printing job which was judged that the head portion confirmation printing has been set to "YES" during absence of the operator in the step S1002, and a flow advances to a step S1006.

Here, since this printed result is used to be immediately confirmed by the operator, even if the printing of another printing job is currently performed, the printing related to the step S1005 cuts in that printing job and this printing is performed. In the step S1006, the CPU 114 displays a confirmation dialog box as described in FIG. 12 on the display part of the operation panel 120, and a flow advances to a step S1007. In the step S1007, the CPU 114 judges whether or not the operator permitted the printing of second and subsequent copies in the dialog box displayed in the step S1006. When it was judged that the operator permitted the printing of second and subsequent copies, a flow advances to a step S1008. When it was judged that the operator did not permit the printing of second and subsequent copies, a flow advances to a step S1010.

In the step S1008, the CPU 114 changes the setting of the head portion confirmation printing of the printing job, which was judged that the head portion confirmation printing has been set to "YES" during absence of the operator in the step S1002, to "NO", and a flow advances to a step S1009. In the step S1009, the CPU 114 subtracts one from the number of printing copies of the printing job, which was judged that the head portion confirmation printing has been set to "YES" during absence of the operator in the step S1002, and a flow advances to a step S1011. Here, a reason of subtracting one from the number of printing copies is that the head portion has already been output for the confirmation. In the step S1010, the CPU 114 deletes the printing job, which was judged that the head portion confirmation printing has been set to "YES" during absence of the operator in the step S1002, from the print queue 203, and a flow advances to the step S1011.

In the step S1011, the CPU 114 judges whether or not a confirmation that the head portion confirmation printing has been set to "YES" was given to all the printing jobs scheduled during absence of the operator. When it was judged that the confirmation was given to all the printing jobs scheduled during absence of the operator, a series of processes is terminated. When it was judged that the confirmation was not given to all the printing jobs, a flow returns to the step S1002.

It has been described that the process described in FIG. 10 is executed when the operator input the absence schedule. However, the process described in FIG. 10 may be executed when the printing schedule was changed by some reason also in other case. For example, there is such a case as "a printing job is newly added to a print queue 203", "an operator manually changed the printing order of a printing job", "a printing schedule of a printing job is shifted as a result of error generation" or the like.

Figure 11:
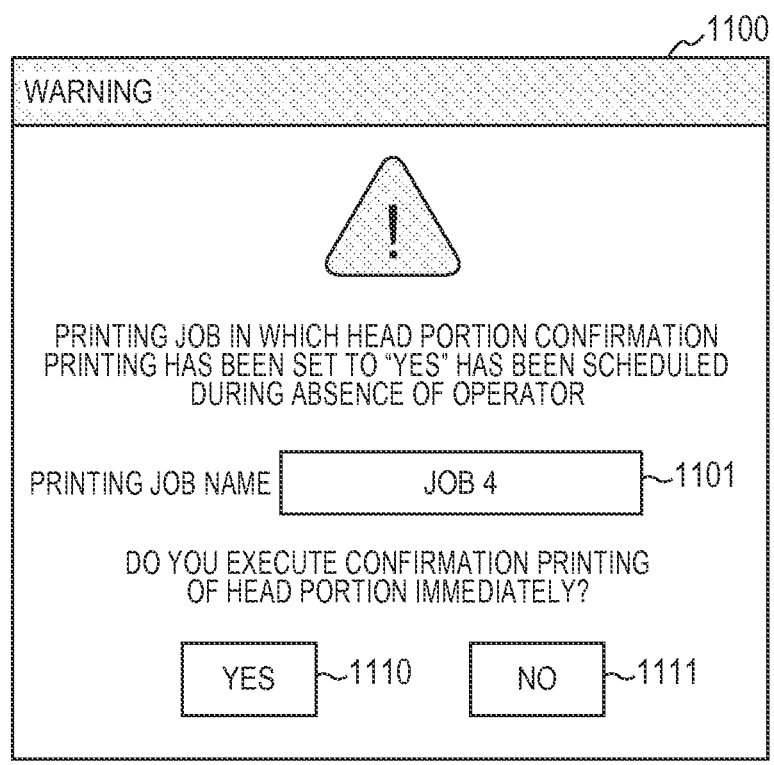
FIG. 11 is a diagram illustrating an example of the UI screen to be displayed on the operation panel.

FIG. 11 is a diagram illustrating an example of the UI screen to be displayed on the operation panel 120 illustrated in FIG. 1. The present example is an example of the warning dialog box to be displayed in the step S1003 in the flow chart described in FIG. 10. In FIG. 11, reference numeral 1100 denotes the whole of a warning dialog box, which is displayed on the operation panel 120 by the CPU 114. Reference numeral 1101 denotes a text box, where a name of the printing job, which was judged that the head portion confirmation printing has been set to "YES" during absence of the operator in the step S1002, is displayed. Buttons 1110 and 1111 are used for accepting whether or not the operator immediately performs the head portion confirmation printing, and when the either button is depressed, the warning dialog box 1100 is closed.

When the button 1110 is depressed, the CPU 114 judges that the operator selected to perform the head portion confirmation printing in the step S1004. On the other hand, when the button 1111 is depressed, the CPU 114 judges that the operator did not select to perform the head portion confirmation printing in the step S1004.

Figure 12:
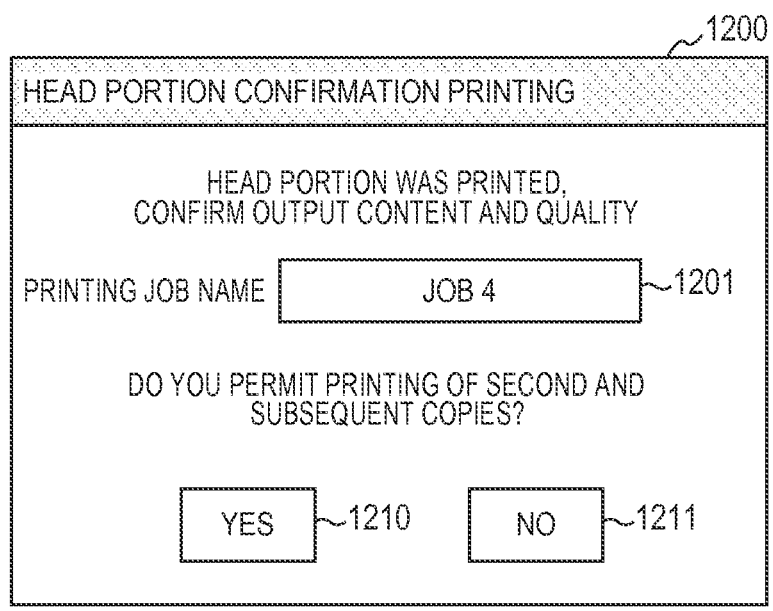
FIG. 12 is a diagram illustrating an example of the UI screen to be displayed on the operation panel.

FIG. 12 is a diagram illustrating an example of the UI screen to be displayed on the operation panel 120 illustrated in FIG. 1. The present example is an example representing the warning dialog box to be displayed in the step S1006 in the flow chart described in FIG. 10. In FIG. 12, reference numeral 1200 denotes the whole of a warning dialog box, which is displayed on the operation panel 120 by the CPU 114. Reference numeral 1201 denotes a text box, where a name of the printing job in which the head portion confirmation printing was performed in the step S1005, is displayed.

Buttons 1210 and 1211 are used for accepting whether or not the operator permits the printing of second and subsequent copies, and when either button is depressed, the warning dialog box 1200 is closed. When the button 1210 is depressed, the CPU 114 judges that the operator permitted the printing of second and subsequent copies in the step S1007. On the other hand when the button 1211 is depressed, the CPU 114 judges that the operator did not permit the printing of second and subsequent copies in the step S1007.

According to the above printing system, in a case that the printing job, in which the head portion confirmation printing has been set to "YES", is scheduled during absence of the operator, it becomes possible to perform the head portion confirmation printing of the printing job before the operator becomes absent. Therefore, since the operator can reduce the possibility of generating the down time during the absence without disabling the head portion confirmation printing setting, the usability is improved.

Fourth Embodiment

In the first and second embodiments, it has been described by exemplifying the confirmation stop in the printing job setting conflict as an example of the printing job setting which needs an operation of operator. In this case, when the printing job, where the confirmation stop in the printing job setting conflict has been set to "YES" during absence of the operator, is scheduled, the down time generation during absence of the operator was avoided by an operation that the setting is changed to set to "NO". However, if the confirmation stop in the printing job setting conflict is changed to set to "NO", an outputting operation is performed with a state that the either setting in the printing settings, which cannot coexist with another setting, is ignored or changed to the default setting in a case that the printing setting, which cannot coexist with another setting, exists in the printing job. Accordingly, despite the fact that the down time generation during the absence can be avoided, an output result is not always a desired result for an operator.

Therefore, in the present embodiment, in a case that the printing job, where the confirmation stop in the printing job setting conflict has been set to "YES", was scheduled during absence of the operator, an example that a conflict resolution operation can be performed before absence of the operator will be described.

In the present embodiment, only the parts different from those of the first and second embodiments will be described, and the same constitution as that of the first and second embodiment will be described by using the same reference numeral. Incidentally, the schematic hardware constitution and the software module configuration of a printing system according to the third embodiment are respectively similar to those described in FIGS. 1 and 2 of the first embodiment.

Figure 13:
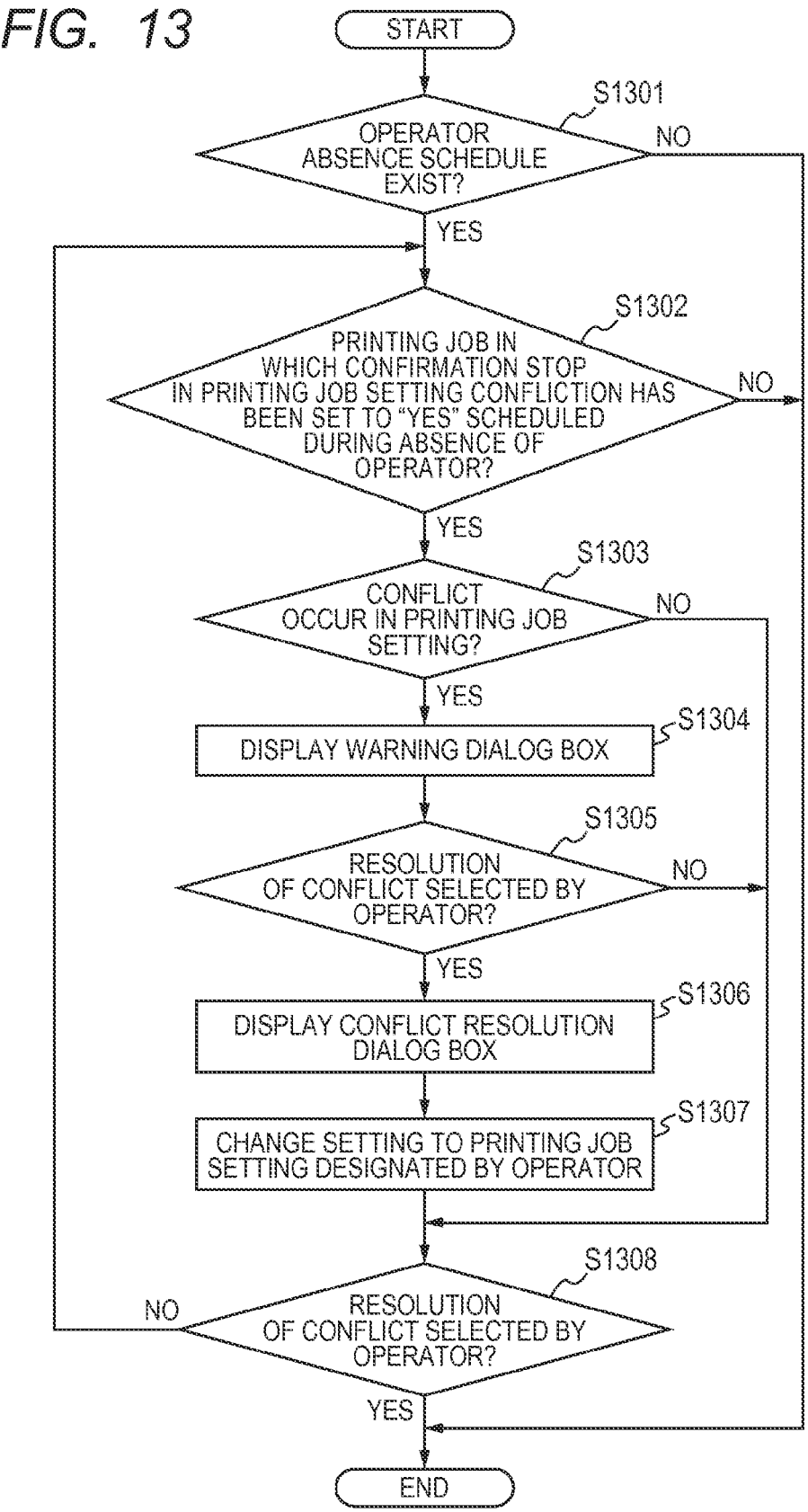
FIG. 13 is a flow chart for describing a control method of the printing apparatus.

FIG. 13 is a flow chart for describing a control method of the printing apparatus indicating the present embodiment. The present example is a processing example of the printing apparatus 110 when the confirmation button 410 was depressed in a dialog screen illustrated in FIG. 4. Each of the steps is realized by a process that the CPU 411 executes control programs stored in the ROM 112 and the HDD 115.

In a step S1301, the CPU 114 confirms information stored in the HDD 115 or the RAM 113 and judges whether or not the stored absence schedule of the operator exists. When the CPU 114 judged that the absence schedule of the operator exists, a flow advances to a step S1302. When the CPU 114 judged that the absence schedule of the operator does not exist, a series of processes is terminated. In the step S1302, the CPU 114 judges whether or not the printing job, where the confirmation stop in the printing job setting conflict has been set to "YES" during absence of the operator, is scheduled. When the CPU 114 judged that the printing job, where the confirmation stop in the printing job setting conflict has been set to "YES" during absence of the operator, is scheduled, a flow advances to a step S1303. When the CPU 114 judged that this printing job is not scheduled, a series of processes is terminated.

In the step S1303, the CPU 114 judges whether or not the printing setting conflict exists in the printing job, which was judged that the confirmation stop in the printing job setting conflict has been set to "YES" during absence of the operator in the step S1302. When the CPU 114 judged that the printing setting conflict exists, a flow advances to a step S1304. When the CPU 114 judged that the printing setting conflict does not exist, a flow advances to a step S1308. In the step S1304, the CPU 114 displays a warning dialog box as described in FIG. 14 on the display part of the operation panel 120, and a flow advances to a step S1305.

In the step S1305, the CPU 114 judges whether or not the operator selected to perform the conflict resolution by immediately performing the setting change of the printing job in the dialog box displayed on the display part of the operation panel 120 in the step S1304.

When the CPU 114 judged that the operator selected to perform the conflict resolution, a flow advances to a step S1306. When the CPU 114 judged that the operator did not select to perform the conflict resolution, a flow advances to the step S1308. In the step S1306, the CPU 114 displays a conflict resolution dialog box as described in FIG. 15 on the display part of the operation panel 120, and a flow advances to a step S1307. In the step S1307, the CPU 114 performs the setting change to the printing job setting designated by the operator in the dialog box displayed in the step S1306, and a flow advances to the step S1308.

In the step S1308, the CPU 114 judges whether or not it was confirmed that the confirmation stop in the printing job setting conflict has been set to "YES" for all the printing jobs scheduled during absence of the operator. When the CPU 114 judged that this confirmation was performed for all the printing jobs scheduled during absence of the operator, a series of processes is terminated. When the CPU 114 judged that this confirmation was not performed for all the printing jobs, a flow returns to the step S1302.

It has been described that the process described in FIG. 13 is executed when the operator input the absence schedule. However, the process described in FIG. 13 may be executed when the printing schedule was changed by some reason also in other case. For example, there is such a case as "a printing job is newly added to a print queue 203", "an operator manually changed the printing order of a printing job", "a printing schedule of a printing job is shifted as a result of error generation" or the like.

Figure 14:
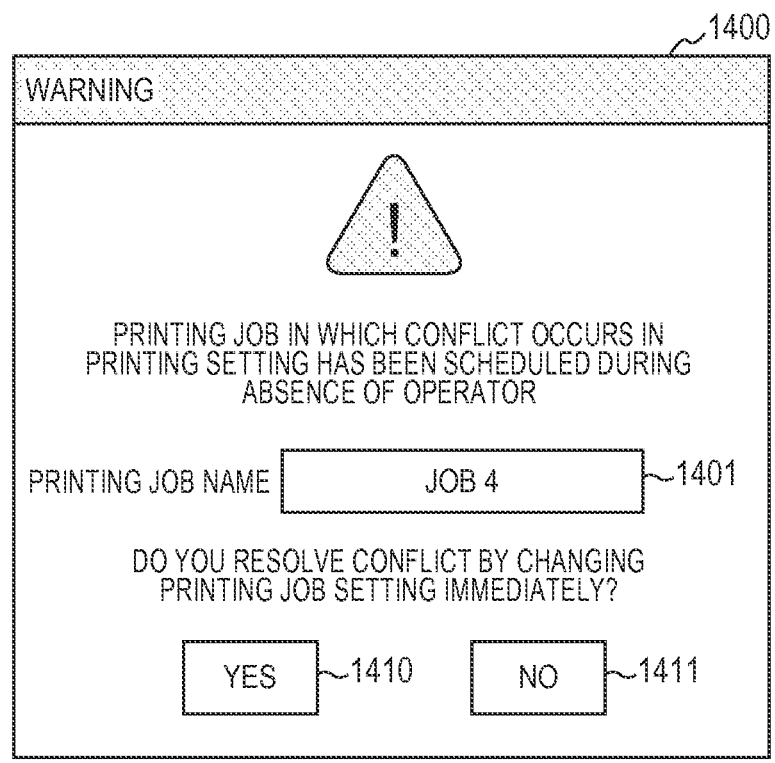
FIG. 14 is a diagram illustrating an example of the UI screen to be displayed on the operation panel.

FIG. 14 is a diagram illustrating an example of the UI screen to be displayed on the operation panel 120 illustrated in FIG. 1. The present example is an example of the warning dialog box to be displayed in the step S1304 in a flow chart described in FIG. 13. In FIG. 14, reference numeral 1400 denotes the whole of a warning dialog box, which is displayed on the operation panel 120 by the CPU 114. Reference numeral 1401 denotes a text box, where a name of the printing job, which was judged that the confirmation stop in the printing job setting conflict has been set to "YES" during absence of the operator in the step S1302, is displayed.

Buttons 1410 and 1411 are used for accepting whether or not the operator performs the conflict resolution by immediately performing the setting change of the printing job, and when the either button is depressed, the warning dialog box 1400 is closed.

When the button 1410 is depressed, the CPU 114 judged that the operator selected to perform the conflict resolution in a step S1405. On the other hand, when the button 1411 is depressed, the CPU 114 judged that the operator did not select to perform the conflict resolution in the step S1405.

Figure 15:
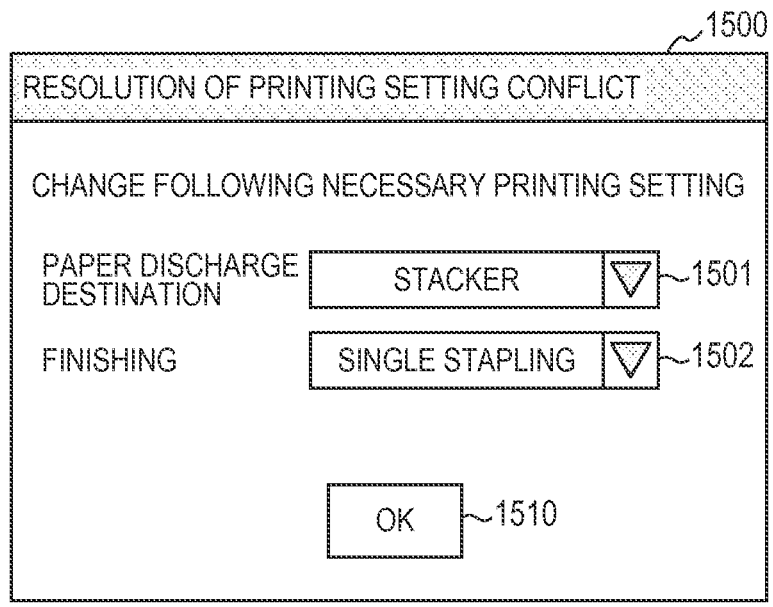
FIG. 15 is a diagram illustrating an example of the UI screen to be displayed on the operation panel.

FIG. 15 is a diagram illustrating an example of the UI screen to be displayed on the operation panel 120 illustrated in FIG. 1. The present example is an example of the conflict resolution dialog box to be displayed in the step S1306 in a flow chart described in FIG. 13. In FIG. 15, reference numeral 1500 denotes the whole of a warning dialog box, which is displayed on the operation panel 120 by the CPU 114. Reference numerals 1501 and 1502 respectively denote interfaces used for performing the setting change of the conflicted printing setting. The operator can resolve the conflict by performing the either setting change among the conflicted settings.

When a confirmation button 1510 is depressed, the printing setting selected at that time is determined and stored in the HDD 115 or the RAM 113. Thereafter, the conflict resolution dialog screen 1500 is closed. Note that the confirmation button 1510 can be depressed only in a state that a combination of the printing settings, by which the conflict is resolved, is selected.

In FIG. 15, a conflict resolution dialog box in a case that the paper discharging destination setting conflicts with the finishing setting is illustrated as an example. Combo box interfaces 1501 and 1502, which are respectively used for changing the setting of a paper discharging destination and the setting of the finishing process, can select other settings by tapping triangular parts respectively indicated on a right side. In FIG. 15, for example, in a case that an operator does not change the printing setting of a paper discharging destination from "stacker", the conflict is resolved by changing the printing setting of the finishing to such the setting capable of performing the output to the stacker. On the other hand, in a case that the operator does not change the printing setting of the finishing from "single stapling", the conflict is resolved by changing the printing setting of the paper discharging destination to such the setting of destination, where the single stapled output material can be output.

According to the above printing system, when the printing job, where the confirmation stop in the printing job setting conflict has been set to "YES" during absence of the operator, is scheduled, it becomes possible to perform the conflict resolution of the printing setting before absence of the operator. Therefore, since the operator can reduce the possibility of generating the down time during the absence after previously changing the setting to the desired printing setting, the usability is improved.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-127239, filed Jun. 18, 2013, which is hereby incorporated by reference herein in its entirety.

What is claimed is:

1. A printing apparatus comprising:
   a setting unit configured to set a time that an operator cannot perform an operation to be performed by the operator according to execution of a job;
   a first determining unit configured to determine a time that an accepted job is executed;
   a second determining unit configured to determine, in a case where a part of the time determined by the first determining unit and a part of the time set by the setting unit overlap each other, whether a printing setting for controlling to stop printing and wait for a restart instruction of the printing from the operator is included in the accepted job; and
   a notifying unit configured to notify, in a case where the second determining unit determines that the printing setting is included in the accepted job, the operator of information for changing the printing setting for controlling to stop printing and wait for the restart instruction of the printing from the operator, wherein a processor functions as at least one of the setting unit, first determining unit, second determining unit and the notifying unit.

2. The printing apparatus according to claim 1, further comprising an accepting unit configured to accept, in the case where the second determining unit determines that the printing setting is included in the accepted job, a change of the printing setting from the operator.

3. The printing apparatus according to claim 1, further comprising a changing unit configured to change, in the case where the second determining unit determines that the printing setting is included in the accepted job, the printing setting to a printing setting not needing an operation of the operator.

4. The printing apparatus according to claim 1, wherein the printing setting is a setting for controlling to stop printing after executing the printing of a first copy of the accepted job and wait for a restart instruction of the printing from the operator.

5. A control method of a printing apparatus, comprising:

setting a time that an operator cannot perform an operation to be performed by the operator according to execution of a job;

a first determining step of determining a time that an accepted job is executed;

a second determining step of, in a case where a part of the determined time and a part of the set time overlap each other, determining whether a printing setting for controlling to stop printing and wait for a restart instruction of the printing from the operator is included in the accepted job; and notifying, in a case where the second determining step determines that the printing setting is included in the accepted job, the operator of information for changing the printing setting for controlling to stop printing and wait for the restart instruction of the printing from the operator.

6. A non-transitory computer-readable storage medium which stores a program to cause a computer to execute a control method of a printing apparatus, the program comprising:

code to set a time that an operator cannot perform an operation to be performed by the operator according to execution of a job;

code of a first determining step of determining a time that an accepted job is executed;

code of a second determining step of determining, in a case where a part of the determined time and a part of the set time overlap each other, whether a printing setting for controlling to stop printing and wait for a restart instruction of the printing from the operator is included in the accepted job; and code for notifying, in a case where the second determining step determines that the printing setting is included in the accepted job, the operator of information for changing the printing setting for controlling to stop printing and wait for the restart instruction of the printing from the operator.

* * * * *